(12) United States Patent  
Inomata (10) Patent No.: US 9,623,751 B2  
(45) Date of Patent: Apr. 18, 2017

(54) HEAD-UP DISPLAY APPARATUS

(71) Applicant: DENSO CORPORATION, Kariya, Aichi-pref. (JP)

(72) Inventor: Makoto Inomata, Handa (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 11 days.

(21) Appl. No.: 14/783,968

(22) PCT Filed: Mar. 21, 2014

(86) PCT No.: PCT/JP2014/001664  
§ 371 (c)(1),  
(2) Date: Oct. 12, 2015

(87) PCT Pub. No.: WO2014/171072  
PCT Pub. Date: Oct. 23, 2014

(65) Prior Publication Data  
US 2016/0046189 A1 Feb. 18, 2016

(30) Foreign Application Priority Data

Apr. 18, 2013 (JP) ................................. 2013-087914

(51) Int. Cl.  
*G02B 27/01* (2006.01)  
*B60K 37/02* (2006.01)  
(Continued)

(52) U.S. Cl.  
CPC ............. *B60K 37/02* (2013.01); *B60K 35/00* (2013.01); *B60K 37/04* (2013.01); *G02B 5/02* (2013.01);  
(Continued)

(58) Field of Classification Search  
CPC ............ B60K 2350/00; B60K 2350/10; B60K 2350/1056; B60K 2350/1064;  
(Continued)

(56) References Cited

U.S. PATENT DOCUMENTS 9,140,903 B2 * 9/2015 Hatakeyama .......... B60K 35/00  
9,222,636 B2 * 12/2015 Hatakeyama .......... B60K 35/00  
(Continued)

FOREIGN PATENT DOCUMENTS

JP 2000203308 A 7/2000  
JP 2001357498 A 12/2001  
(Continued)

OTHER PUBLICATIONS

International Search Report and Written Opinion (in Japanese with English Translation) for PCT/JP2014/001664, mailed May 13, 2014; ISA/JP.

*Primary Examiner* — Derek S Chapel  
(74) *Attorney, Agent, or Firm* — Harness, Dickey & Pierce, P.L.C.

(57) ABSTRACT

A head-up display apparatus includes light emission units, a first reflection unit, a second reflection unit, a first diffusion unit, a second diffusion unit, and a driver unit. The light emission units are disposed along one end surface of an upper or lower end surface of a combiner, and emit light. The first reflection unit is disposed to a part of the light emission units, and reflects the light. The second reflection unit is disposed to a part of the light emission units, and reflects the light. The first diffusion unit is disposed in the first side end surface, and diffuses the light. The second diffusion unit is disposed in the second side end surface, and diffuses the light. The driver unit selectively drives one of the light emission unit, and causes to emit the light. The combiner includes an invisible region.

6 Claims, 8 Drawing Sheets

(51) Int. Cl.
*B60K 35/00* (2006.01)
*F21V 8/00* (2006.01)
*B60K 37/04* (2006.01)
*G02B 5/02* (2006.01)

(52) U.S. Cl.
CPC ....... *G02B 6/0018* (2013.01); *G02B 27/0101* (2013.01); *B60K 2350/1056* (2013.01); *B60K 2350/1096* (2013.01); *B60K 2350/2008* (2013.01); *B60K 2350/965* (2013.01); *G02B 2027/013* (2013.01); *G02B 2027/0118* (2013.01); *G02B 2027/0141* (2013.01)

(58) Field of Classification Search
CPC .... B60K 2350/1068; B60K 2350/1072; B60K 2350/1096; B60K 2350/2008; B60K 2350/203–2350/2043; B60K 2350/2052; B60K 2350/2056; B60K 2350/2095; B60K 2350/96; B60K 2350/962; B60K 2350/965
USPC .................................................. 359/599, 630
See application file for complete search history.

(56) References Cited

U.S. PATENT DOCUMENTS

| | | | |
|---|---|---|---|
| 9,417,448 B2 * | 8/2016 | Takasu | G02B 27/01 |
| 9,423,614 B2 * | 8/2016 | Takasu | G02B 27/0101 |
| 9,429,753 B2 * | 8/2016 | Takasu | G02B 27/01 |
| 2012/0176683 A1 | 7/2012 | Rumpf et al. | |
| 2012/0200476 A1 * | 8/2012 | Kanamori | G02B 27/0101 345/7 |
| 2012/0287674 A1 * | 11/2012 | Nichol | G02B 6/0018 362/611 |
| 2015/0219834 A1 * | 8/2015 | Nichol | G02B 6/0076 362/607 |

FOREIGN PATENT DOCUMENTS

| | | |
|---|---|---|
| JP | 2005242526 A | 9/2005 |
| JP | 2005343351 A | 12/2005 |
| JP | 2008176022 A | 7/2008 |
| JP | 2009292223 A | 12/2009 |
| JP | 2012145902 A | 8/2012 |

* cited by examiner

| PRESENCE DIRECTION OF DANGEROUS OBJECT | DEGREE OF RISK | LIGHTING LED | STATE OF COMBINER |
|---|---|---|---|
| RIGHT DIRECTION OF VEHICLE | SMALL | LED122B | RIGHT SIDE EMITS BLUE LIGHT |
| | MEDIUM | LED122G | RIGHT SIDE EMITS GREEN LIGHT |
| | LARGE | LED122A | RIGHT SIDE EMITS AMBER LIGHT |
| LEFT DIRECTION OF VEHICLE | SMALL | LED124B | LEFT SIDE EMITS BLUE LIGHT |
| | MEDIUM | LED124G | LEFT SIDE EMITS GREEN LIGHT |
| | LARGE | LED124A | LEFT SIDE EMITS AMBER LIGHT |

FIG. 7B

| PRESENCE DIRECTION OF DANGEROUS OBJECT | DEGREE OF RISK | LIGHTING LED | STATE OF COMBINER |
|---|---|---|---|
| FORWARD DIRECTION OF VEHICLE | SMALL | LED122B +LED124B | BOTH SIDES EMITS BLUE LIGHT |
| | MEDIUM | LED122G +LED124G | BOTH SIDES EMITS GREEN LIGHT |
| | LARGE | LED122A +LED124A | BOTH SIDES EMITS AMBER LIGHT |

HEAD-UP DISPLAY APPARATUS

CROSS REFERENCE TO RELATED APPLICATIONS

This application is a U.S. National Phase Application under 35 U.S.C. 371 of International Application No. PCT/JP2014/001664 filed on Mar. 21, 2014 and published in Japanese as WO 2014/171072 A1 on Oct. 23, 2014. This application is based on and claims the benefit of priority from Japanese Patent Application No. 2013-087914 filed on Apr. 18, 2013. The entire disclosures of all of the above applications are incorporated herein by reference.

TECHNICAL FIELD

The present disclosure relates to a head-up display apparatus that projects an image to a transparent plate member disposed in front of a driver seat to display the image superimposed to a scenery in front of the driver seat.

BACKGROUND ART

As a technology enabling various information to be provided to a driver in a vehicle without moving the line of sight from a front, a head-up display apparatus projects an image to a transparent plate member that is called a combiner and enables the image to be displayed superimposed to a front view.

Information such as a vehicle speed is normally displayed on the combiner of the head-up display apparatus. When a dangerous object such as a pedestrian or an obstacle is detected, the head-up display apparatus displays a fact that the dangerous object is present to warn a driver (Patent literature 1). In addition, in order to prevent a display for a warning about the presence of the dangerous object from blocking a forward field of vision of the driver and a driving from being hindered, a light is emitted upward from an upper end surface of the combiner, so that a windshield above the field of view of the driver is brightened and a warning about the presence of the dangerous object is given (Patent literature 2).

However, in any technologies, there is a difficulty that it may be difficult for a driver who receives a warning to immediately cope with a dangerous object such as a pedestrian, an obstacle. A width of the combiner is not very large when viewed from a driver. Thus, even when a fact that a dangerous object is present is displayed on the combiner, a position where the dangerous object is present (at least which direction the dangerous object is present in a lateral direction when viewed from the driver) is not displayed. Thus, the warned driver may need to look around the vehicle and search the dangerous object before taking a specific action. The driver may not cope with the dangerous object, immediately.

PRIOR ART DOCUMENT

Patent Document

Patent literature 1: JP 2001-357498 A
Patent literature 2: JP 2009-292223 A

SUMMARY OF THE INVENTION

It is an object of the present disclosure to provide a head-up display apparatus that warns a driver about the presence of a dangerous object such as a pedestrian or an obstacle in an immediate treatable mode.

A head-up display apparatus according to one aspect of the present disclosure projects an image to a surface of a combiner, which is a transparent plate member disposed in front of a driver seat, and displays the image superimposed to a front view of the combiner, and includes multiple light emission units, a first reflection unit, a second reflection unit, a first diffusion unit, a second diffusion unit, and a driver unit.

The multiple light emission units are disposed along one end surface of an upper end surface or a lower end surface of the combiner, and emit light from the one end surface toward an interior of the combiner. The first reflection unit is disposed in a part of the plurality of light emission units, and reflects the light emitted by the light emission units toward the interior of the combiner, toward a first side end surface that is one side end surface of the combiner. The second reflection unit is disposed in a part of the plurality of light emission units, and reflects the light emitted by the light emission units toward the interior of the combiner, toward a second side end surface that is a side end surface facing the first side end surface.

The first diffusion unit is disposed to the first side end surface of the combiner, and diffuses the light reaching the first side end surface through the interior of the combiner. The second diffusion unit is disposed on the second side end surface of the combiner, and diffuses the light reaching the second side end surface through the interior of the combiner. The driver unit selectively drives at least one of the light emission unit having the first reflection unit and the light emission unit having the second reflection unit, and causes to emit the light from the driven light emission unit.

According to the head-up display apparatus, when the light emission unit having the first reflection unit operates, the light is reflected on the first reflection unit, and reaches the first side end surface of the combiner, and it may be possible to brighten the first diffusion unit disposed on the first side end surface. When the light emission unit having the second reflection unit operates, the light is reflected on the second reflection unit, and reaches the second side end surface, and it may be possible to brighten the second diffusion unit. Since it may be possible for the driver to intuitively recognize a direction along which the dangerous object such as a pedestrian and an obstacle is present according to which side of the combiner is brightened, it may be possible for the driver to cope with the dangerous object such as the pedestrian and the obstacle immediately.

BRIEF DESCRIPTION OF THE DRAWINGS

The above and other objects, features and advantages of the present disclosure will become more apparent from the following detailed description made with reference to the accompanying drawings. In the drawings.

PREFERRED EMBODIMENTS FOR CARRYING OUT THE INVENTION

First Embodiment

Figure 1A:
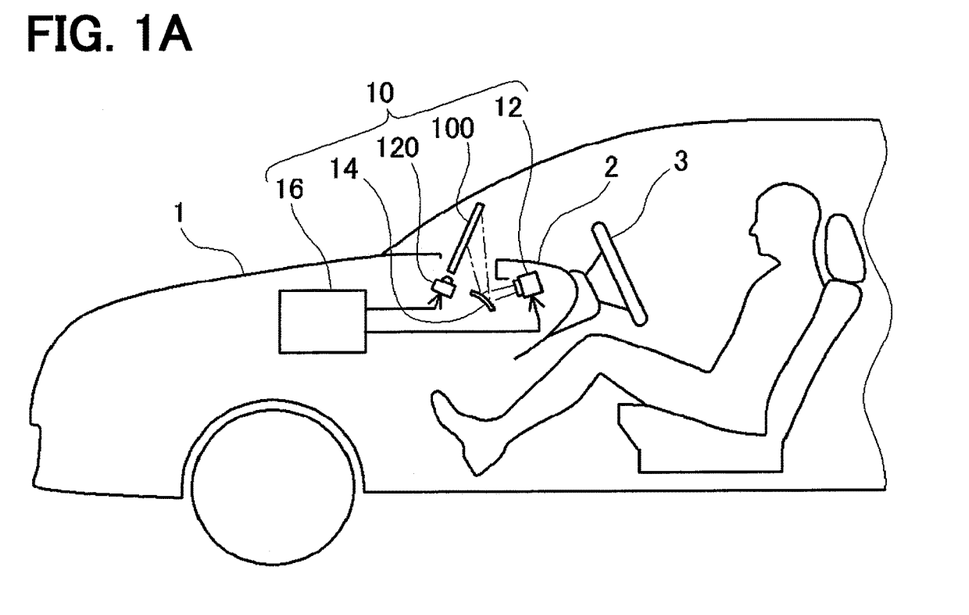
FIG. 1A is a diagram illustrating an overall configuration of a vehicle to which a head-up display apparatus is mounted.
Figure 1B:
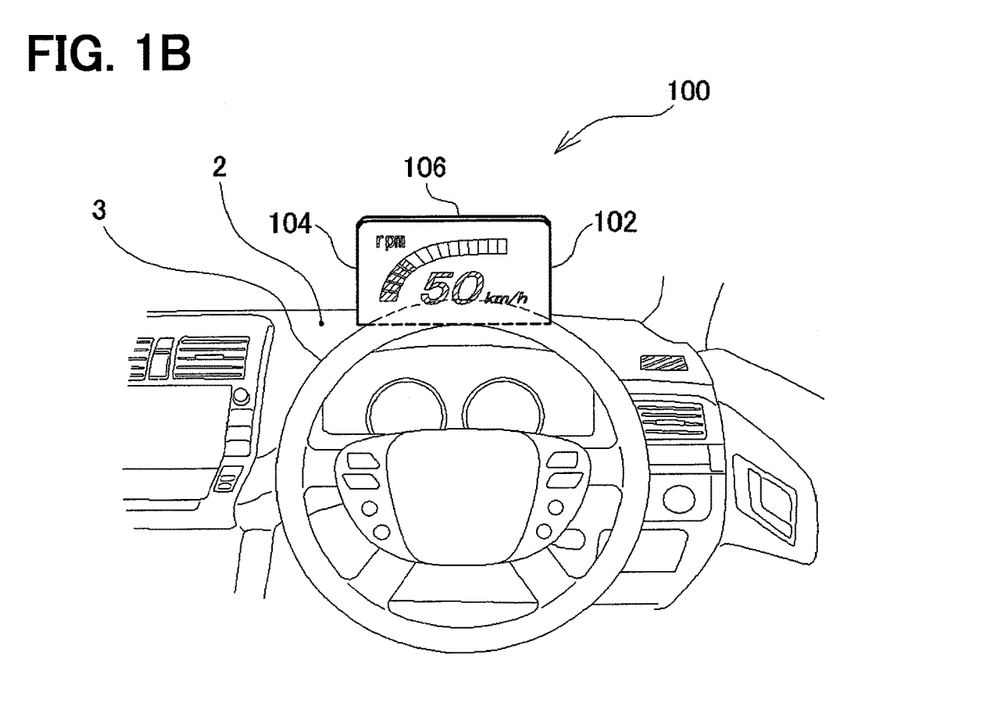
FIG. 1B is a diagram illustrating a state where an image indicative of a vehicle speed and an engine rotation speed is projected to a combiner.

A first embodiment of the present disclosure will be described with referring to the drawings. FIG. 1A and FIG. 1B illustrate a head-up display apparatus 10 according to the present embodiment, mounted to a dashboard 2 of a vehicle 1. As illustrated in FIG. 1A, the head-up display apparatus 10 according to the present embodiment includes a combiner 100 to which an image is projected and displayed, an image projection unit 12 that projects the image displayed to the combiner 100, a convex mirror 14 that reflects the image projected from the image projection unit 12 toward the combiner 100, an LED unit 120 that emits a light from an end surface of the combiner 100 toward an interior of the combiner 100, and a control device 16 that controls an operation of the image projection unit 12 and the LED unit 120.

The combiner 100 is a plate member made of a transparent material such as acrylic resin, and a driver of the vehicle 1 can visually recognize a front view of the vehicle 1 through the combiner 100. When an image from the image projection unit 12 is projected to the combiner 100, the driver can also visually recognize the projected image superimposed to the front view of the vehicle 1. FIG. 1B illustrates a state in which an image indicative of a vehicle speed and an engine rotation speed is projected to the combiner 100 as an example.

Figure 2:
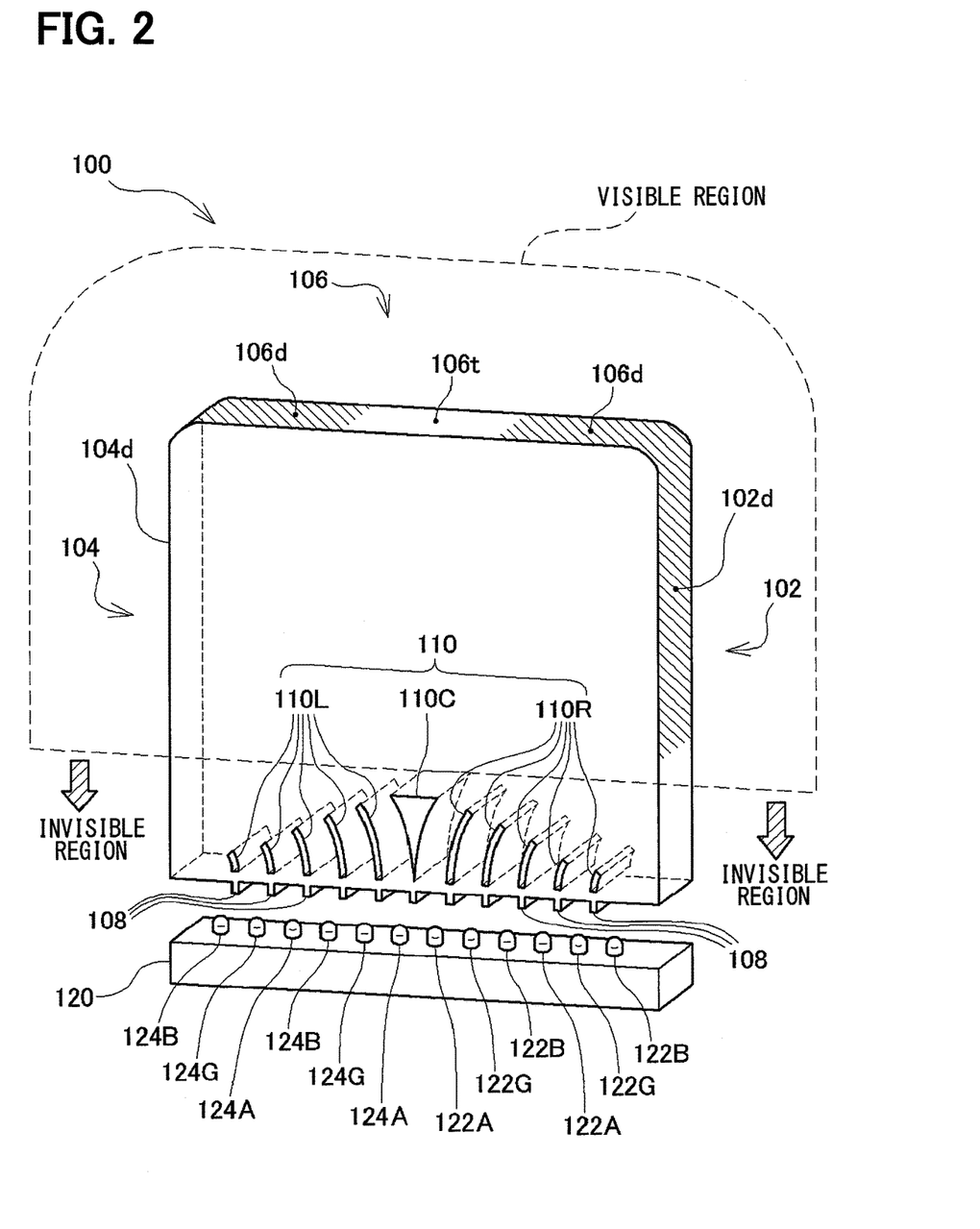
FIG. 2 is a perspective view illustrating an external shape of the combiner and an LED unit mounted in the head-up display apparatus.

FIG. 2 illustrates a perspective view of the combiner 100 and the LED unit 120 according to the present embodiment. As described above, the combiner 100 is a plate member made of a transparent material. A lower portion of the member is housed in the dashboard 2. The lower portion corresponds to an invisible region that cannot be seen from the driver. A portion upper than the invisible region of the combiner 100 is projected from the dashboard 2, and corresponds to a visible region that can be visually recognized by the driver.

An end surface (hereinafter, referred to as a right side end surface 102) on a right side of the combiner 100 when viewed from a driver seat, which is a visible region of the combiner 100, is subjected to emboss processing to form a right side embossed surface 102d. An end surface (hereinafter, referred to as a left side end surface 104) on a left side of the combiner 100 when viewed from the driver seat is subjected to emboss processing to form a left side embossed surface 104d. Incidentally, the emboss processing is a process forming small irregularities on a surface of an object. In configurations of a surface obtained by the emboss processing, there are a configuration called a satin pattern in which each of irregularities is independent from each other and rough like a pear skin, a configuration called a leather pattern in which wrinkle-like irregularities are formed like tanned leather, a configuration called a wood grain pattern in which continuous irregularities are formed like wood grains, and a configuration called a geometric pattern in which a geometric pattern is formed by irregularities, for example. Any emboss processing may be used in the present embodiment.

An upper embossed surface 106d subjected to the emboss processing is provided to each side (a side of the right side end surface 102 and a side of the left side end surface 104) of an upper end surface 106 of the combiner 100. A light transmission surface 106t that is not subjected to the emboss processing is provided between the upper embossed surfaces 106d. This example will describe assuming that the light transmission surface 106t is not subjected to the emboss processing. But the light transmission surface 106t may be subjected to the emboss processing when the emboss processing is lighter in the degree than that of the upper embossed surface 106d.

Multiple passages that penetrate from a front side to a rear side of the combiner 100 are defined in a portion of an invisible region, which is below the combiner 100. When viewed from a display surface (a surface to which the image is projected) side of the combiner 100, since the passages are shaped into grooves, and since the interior of the passage is filled with air, the passages are called an air groove 110 in the following description.

A rightward air groove 110R of the air groove 110 formed on a right portion when viewed from the driver seat has a shape gently curved from a portion close to a lower end surface of the combiner 100 toward the right side end surface 102 that is disposed at an upper right side. A leftward air groove 110L formed on a left portion when viewed from the driver seat has a shape gently curved from a portion close to the lower end surface of the combiner 100 toward the left side end surface 104 that is disposed at an upper left side. A center air groove 110C is formed in the center of the combiner 100. In the center air groove 110C, a right side surface is curved toward the right side end surface 102, and a left side surface is curved toward the left side end surface 104. A small partitioning portion 108 extends in a thickness direction of the combiner 100 at multiple locations on a lower end surface of the combiner 100. Since the air groove 110 is defined in the invisible region of the combiner 100, the combiner 100 is not defiled.

By contrast, the LED unit 120 is disposed below the combiner 100. Multiple LEDs in the LED unit 120 are disposed toward the lower end surface of the combiner 100. In an example shown in FIG. 2, in a right half of the LED unit 120 when viewed from the driver seat, a blue LED 122B, a green LED 122G, and an amber LED 122A are alternately arranged from the right end in this order. In a left half of the LED unit 120 when viewed from the driver seat, a blue LED 124B, a green LED 124G, and an amber LED 124A are alternately arranged from the left end in this order.

The blue LED 122B, the green LED 122G, and the amber LED 122A disposed on the right half of the LED unit 120 may be collectively called a right LED 122. The blue LED 124B, the green LED 124G, and the amber LED 124A disposed on the left half of the LED unit 120 may be collectively called a left LED 124.

The light emitted from the right LED 122 enters the interior of the combiner 100 from the lower end surface of the combiner 100, and travels straightly in the interior of the combiner 100. The light is reflected by the rightward air groove 110R (or a right side surface of the center air groove 110C), and reaches the right side end surface 102 of the combiner 100. The right side end surface 102 of the combiner 100 is brightened by lightening the right LED 122. The light emitted from the left LED 124 enters the lower end surface of the combiner 100, and travels straightly in the interior of the combiner 100. The light is reflected by the leftward air groove 110L (or a left side surface of the center air groove 110C), and reaches the left side end surface 104. The left side end surface 104 of the combiner 100 is brightened by lightening the left LED 124.

In the present embodiment, the right LED 122 and the left LED 124 disposed in the LED unit 120 correspond to a light emission unit. The right side end surface 102 of the combiner 100 corresponds to a first side end surface. The right side embossed surface 102*d* disposed in the right side end surface 102 corresponds to a first diffusion unit. The left side end surface 104 of the combiner 100 corresponds to a second side end surface. The left side embossed surface 104*d* disposed in the left side end surface 104 corresponds to a second diffusion unit. The upper embossed surface 106*d* disposed in the upper end surface 106 of the combiner 100 corresponds to a light diffusion unit. The light transmission surface 106*t* corresponds to a light transmission unit. The rightward air groove 110R disposed in the invisible region of the combiner 100 corresponds to a first reflection unit. The leftward air groove 110L corresponds to a second reflection unit.

Figure 3:
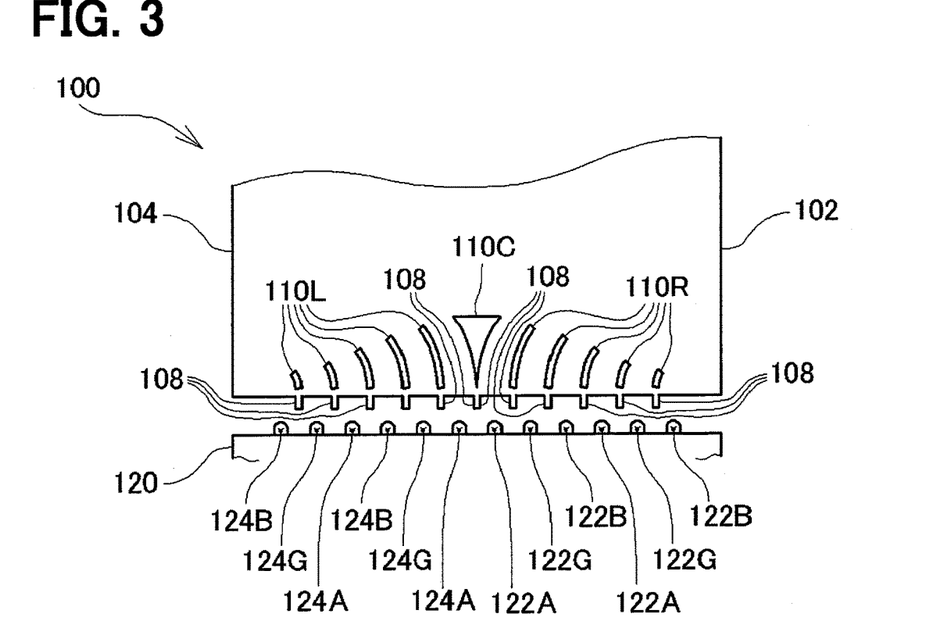
FIG. 3 is a diagram illustrating a positional relationship of an air groove defined in the combiner and various LEDs disposed in the LED unit.

FIG. 3 illustrates a positional relationship of the air groove 110 disposed in the combiner 100, the partitioning portion 108 projected toward the lower end surface of the combiner 100, and the right LED 122 and the left LED 124 disposed in the LED unit 120. As described above, the rightward air groove 110R and the leftward air groove 110L are each formed into a shape curved from a portion close to the lower end surface of the combiner 100 toward the right side end surface 102 at the upper right side or the left side end surface 104 at the upper left side. The partitioning portion 108 is projected at the positions below the rightward air groove 110R or the leftward air groove 110L close to the lower end surface. The partitioning portion 108 is also projected below the center air groove 110C close to the lower end surface. The right LED 122 and the left LED 124 in the LED unit 120 are disposed between the respective adjacent partitioning portions 108.

Figure 4:
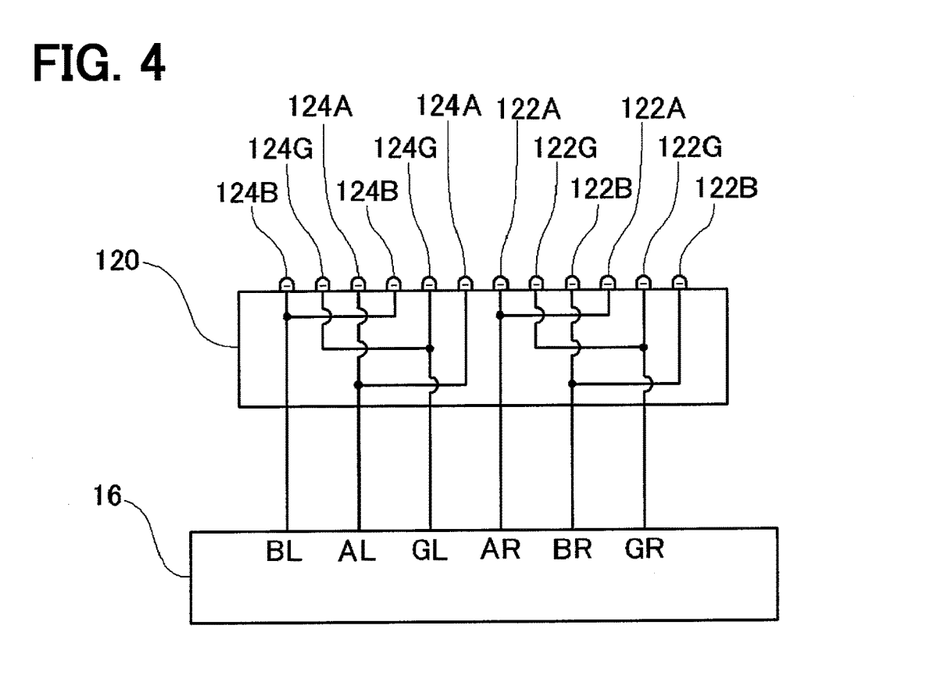
FIG. 4 is a diagram illustrating a wire connection relationship of the respective LEDs in the LED unit.

FIG. 4 illustrates a state in which the right LED 122 and the left LED 124 are connected to each other in the interior of the LED unit 120. As illustrated in the figure, the two blue LEDs 122B disposed in the right LED 122 are connected into one piece, and connected to a BR output terminal of the control device 16. The two green LEDs 122G disposed in the right LED 122 are connected to a GR output terminal of the control device 16, and the two amber LEDs 122A of the right LED 122 are connected to a UR output terminal of the control device 16. The two blue LEDs 124B disposed in the left LED 124 are connected to a BL output terminal of the control device 16, and the two green LEDs 124G of the left LED 124 are connected to a GL output terminal of the control device 16, and the two amber LEDs 124A of the left LED 124 are connected to a UL output terminal of the control device 16.

Thus, the control device 16 selects any one from the six output terminals, and turns on the selected output terminal, thereby enabling to lighten the right LED 122 or the left LED 124, which are connected to the output terminal. For example, when the BR output terminal turns on, the blue LEDs 122B of the right LED 122 are lightened, and when the BL output terminal turns on, the blue LEDs 124B of the left LED 124 are lightened. The control device 16 according to the present embodiment corresponds to a driver unit. The light emitted from the right LED 122 or the left LED 124 enters the lower end surface of the combiner 100, and is led to the right side end surface 102 or the left side end surface 104 of the combiner 100.

Figure 5:
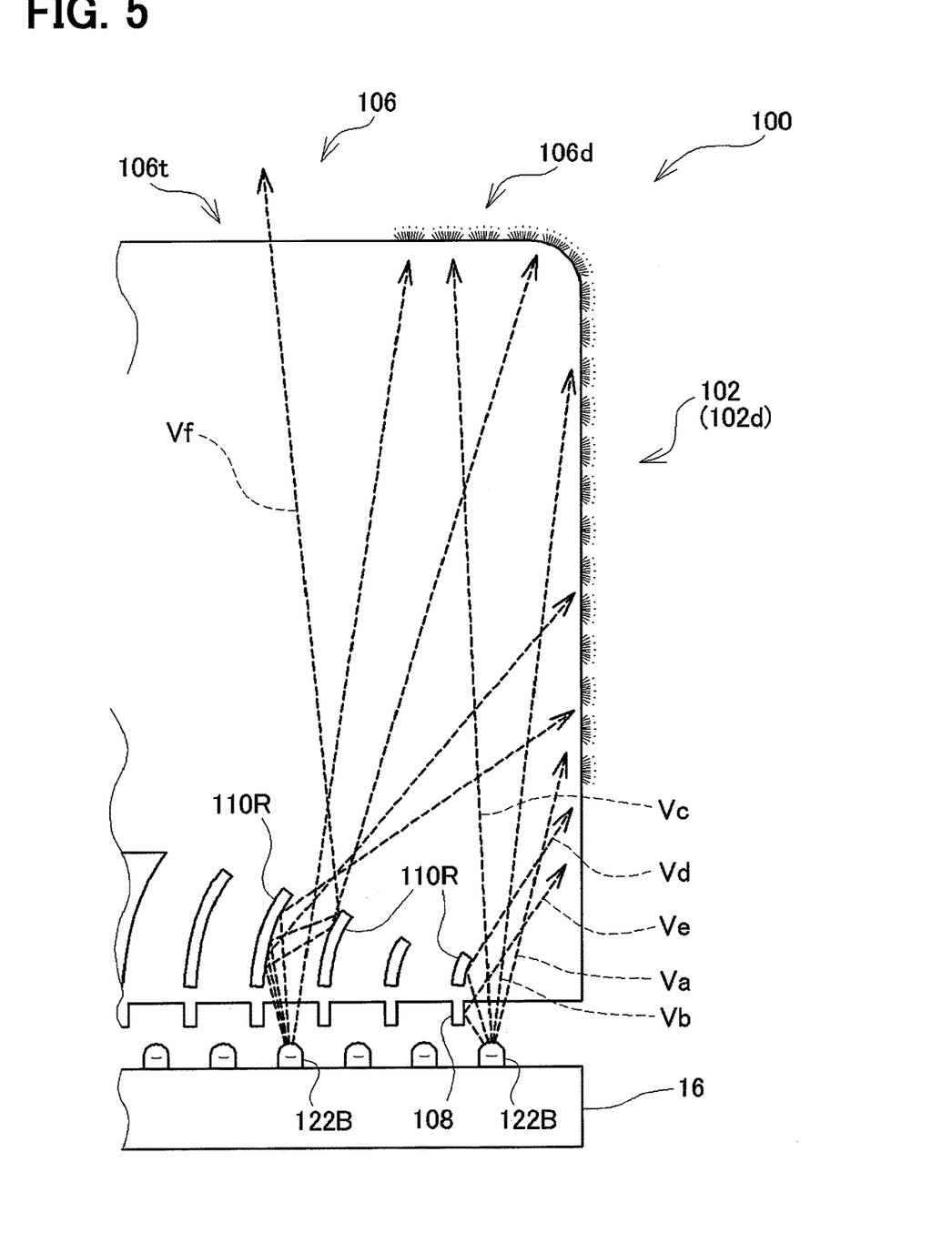
FIG. 5 is a diagram illustrating a state in which a light entering an interior of the combiner is led to a right side end surface.

FIG. 5 illustrates an example where the blue LEDs 122B are turned on, and the light emitted from the right LED 122 is led to the right side end surface 102 of the combiner 100. The blue LED 122B on a right side in the figure will be described. Since the blue LED 122B is disposed in close proximity of the right side end surface 102 of the combiner 100, after the lights (for example, lights indicated by an arrow Va and an arrow Vb in the figure) emitted rightward from the blue LED 122B enter the interior of the combiner 100 from the lower end surface of the combiner 100, the lights travel straightly as they are, and reach the right side end surface 102. As describe above, since the right side embossed surface 102*d* is formed in the right side end surface 102, the light that has reached the right side embossed surface 102*d* is irregularly reflected to brighten the right side end surface 102 of the combiner 100 in blue.

The light emitted from the blue LED 122B toward just above, and the light emitted slightly leftward (for example, light indicated by an arrow Vc in the figure) reaches the upper embossed surface 106*d* formed in a right portion of the upper end surface 106 of the combiner 100 to brighten the right portion of the upper end surface 106 of the combiner 100 in blue.

By contrast, the rightward air groove 110R extended from a portion close to the lower end surface of the combiner 100 toward above is formed in the interior of the left combiner 100 of the blue LED 122B. Therefore, after the light emitted leftward from the blue LED 122B travels straightly in the interior of the combiner 100, the light crosses with the rightward air groove 110R defined on the left side of the blue LED 122B at a shallow angle.

In this example, the interior of the rightward air groove 110R is filled with air. A refractive index of air is smaller than a refractive index of a material (acrylic resin or the like) providing the combiner 100. When the light that has traveled in a medium large in the refractive index is to be input toward a medium small in the refractive index and at a shallow angle to a boundary surface, a phenomenon called a total reflection where all of the lights are reflected on the boundary surface occurs. Conditions under which the total reflection occurs are that "light is input from a medium larger in a refractive index toward another medium smaller in a refractive index", and "an incident angle (angle to a normal of the boundary surface) of the light to the boundary surface of the media different in the refractive index is larger than a critical angle determined according to these refractive indexes", and those conditions may be called "conditions of total reflection (or total reflection conditions). Incidentally, it is known that the critical angle on the boundary surface between acrylic resin and air is about 42 degree to 43 degree.

The light that has traveled in the interior of the combiner 100, and reached the rightward air groove 110R intersects with the side surface of the rightward air groove 110R at a shallow angle. Since a refractive index of a material (acrylic resin or the like) of the combiner 100 is larger than a refractive index of air, the conditions for total reflection are satisfied. For that reason, as indicated by an arrow Vd in FIG. 5, all of the light that has been emitted leftward from the blue LED 122B and reached the rightward air groove 110R is reflected by side surfaces of the rightward air groove 110R, travels straightly in the interior of the combiner 100, and reaches the right side end surface 102. As a result, the light is irregularly reflected by the right side embossed surface 102d, and brightens the right side end surface 102 of the combiner 100 in blue. The rightward air groove 110R is gently curved toward the right side end surface 102. For that reason, even when the light is emitted upward than an arrow Vd, the light is emitted at the same angle to the rightward air groove 110R, and the light from the blue LED 122B can be efficiently reflected toward the right side end surface 102.

Further, as indicated by an arrow Ve in FIG. 5, the light emitted further leftward from the blue LED 122B is blocked by the partitioning portion 108 projected from the lower end surface of the combiner 100, and reflected by surfaces of the partitioning portion 108 toward the right side end surface 102. Since the reflection from the partitioning portion 108 is incident from the medium (air) small in the refractive index toward the medium (acrylic resin or the like) large in the refractive index, the conditions for total reflection are not satisfied. For that reason, a part of the light enters the interior of the partitioning portion 108 by refraction, but the remaining light is reflected toward the right side end surface 102, and brightens the right side end surface 102 of the combiner 100 in blue.

The blue LED 122B on the right side disposed in the right LED 122 is described above. The similar explanation is roughly applied to the blue LED 122B on the left side. The light emitted from the blue LED 122B on the left side is totally reflected on a side surface of the rightward air groove 110R, and reaches the right side end surface 102 of the combiner 100. Alternatively, the light reaches a right portion of the upper end surface 106 of the combiner 100. Thus, the light is irregularly reflected by the right side embossed surface 102d of the right side end surface 102 to brighten the right side end surface 102 of the combiner 100 in blue, or irregularly reflected by the upper embossed surface 106d of the upper end surface 106 of the combiner 100 to brighten a right portion of the upper end surface 106 in blue.

As described by an arrow Vf in FIG. 5, a part of the light emitted from the blue LED 122B may reach the light transmission surface 106t of the upper end surface 106. Since the light transmission surface 106t is not subjected to the emboss processing, the light that has reached the light transmission surface 106t is transmitted through the light transmission surface 106t without being irregularly reflected. Therefore, a portion of the light transmission surface 106t does not appear brightened in blue.

The blue LED 122B disposed in the right LED 122 is described above. The similar explanation is applied to the green LED 122G and the amber LED 122A. Therefore, the right side end surface 102 of the combiner 100 and the right portion of the upper end surface 106 are brightened in green by turning on the green LED 122G. Similarly, the right side end surface 102 of the combiner 100 and the right portion of the upper end surface 106 are brightened in amber by lightening the amber LED 122A. Since the light is transmitted through the light transmission surface 106t without irregularly reflected even when the light reaches the light transmission surface 106t, a portion of the light transmission surface 106t is not brightened in green or amber.

The similar explanation is applied to the left LED 124. When the blue LED 124B disposed on the left side of the LED unit 120 is lightened, the left side end surface 104 of the combiner 100 and the left portion of the upper end surface 106 are brightened in blue. When the green LEDs 124G or the amber LEDs 124A on the left side of the LED unit 120 are lightened, the left side end surface 104 of the combiner 100 and a portion on the left side of the upper end surface 106 are brightened in green or amber.

Figure 6A:
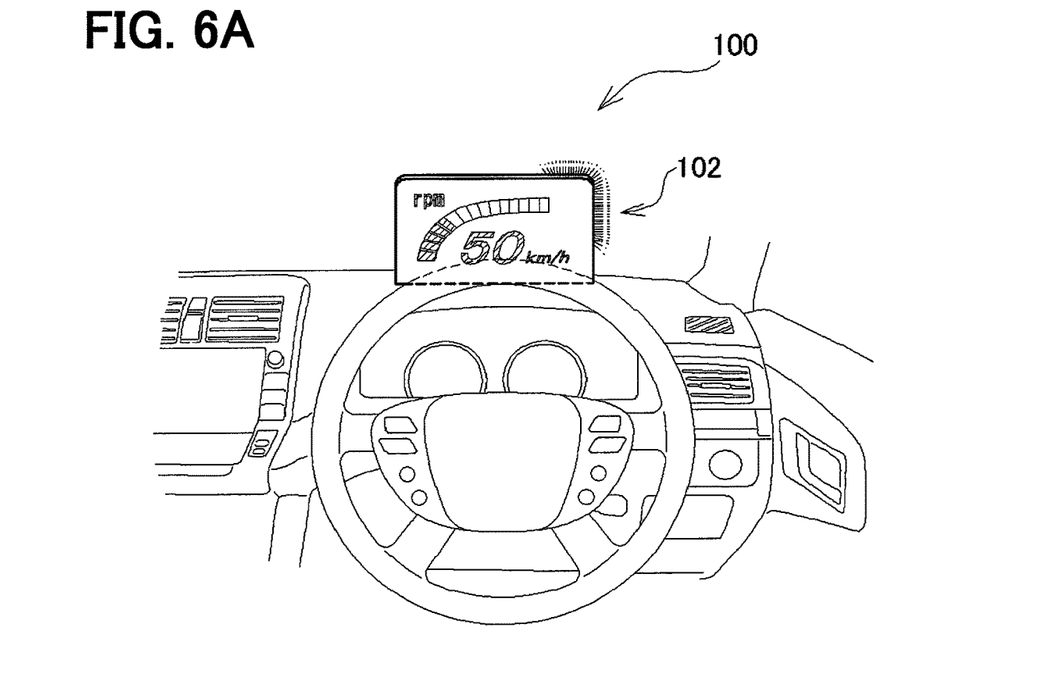
FIG. 6A is a diagram illustrating a state in which the right side end surface of the combiner is brightened to display information on a location of a dangerous object.
Figure 6B:
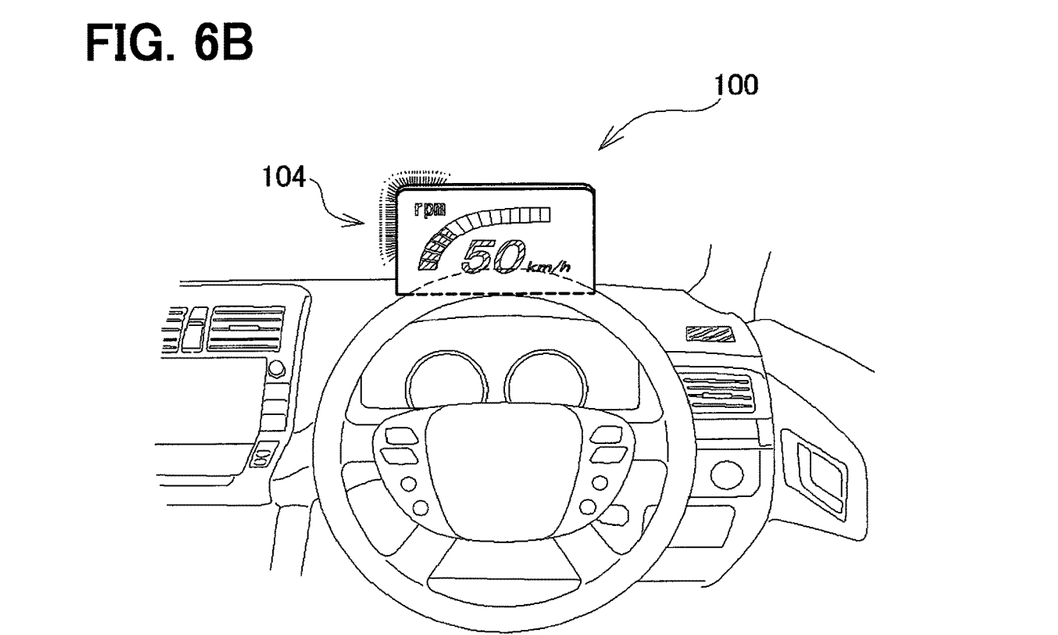
FIG. 6B is a diagram illustrating a state in which a left side end surface of the combiner is brightened to display information on a location of a dangerous object.

FIG. 6A and FIG. 6B illustrate states viewed from the driver seat when the right side end surface 102 or the left side end surface 104 of the combiner 100 is brightened. FIG. 6A illustrates a state in which the right side end surface 102 of the combiner 100 is brightened. When the right side end surface 102 is brightened, the driver enables to intuitively understand that the dangerous object or the like is present on the right side of the vehicle 1. FIG. 6B illustrates a state in which the left side end surface 104 of the combiner 100 is brightened. When the left side end surface 104 is thus brightened, the driver enables to intuitively understand that the dangerous object or the like is present on the left side of the vehicle 1.

The light transmission surface 106t is disposed to the center of the upper end surface 106 of the combiner 100. The light transmission surface 106t is not subjected to the emboss processing. Thus, even when a part of the light emitted from the right LED 122 reaches the light transmission surface 106t, the light transmission surface 106t is not brightened. Similarly, even when a part of the light emitted from the left LED 124 reaches the light transmission surface 106t, the light transmission surface 106t is not brightened. When the right LED 122 is lightened, as illustrated in FIG. 6A, only the right side end surface 102 and the right portion of the upper end surface 106 are brightened. When the left LED 124 is lightened, as illustrated in FIG. 6B, only the left side end surface 104 and the left portion of the upper end surface 106 are brightened. Thus, it may be possible for the driver to easily recognize where the dangerous object is present in the lateral direction.

The combiner 100 according to the present embodiment enables to change the light for brightening the right side end surface 102 or the left side end surface 104 to blue, green, or amber. Therefore, with the colors, it may be possible that information other than the direction toward which the dangerous object is present is displayed in a configuration that the driver enables to intuitively understand.

Figure 7A:
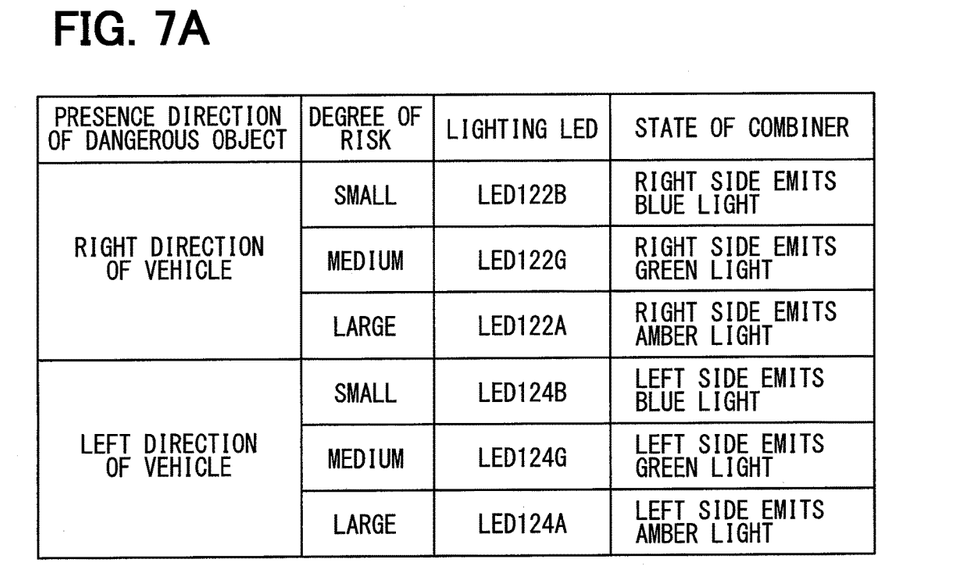
FIG. 7A is a diagram illustrating an example of a method to display information on a degree of risk when the dangerous object is detected in a right direction or a left direction of the vehicle.

FIG. 7A illustrates a case in which the color for brightening the right side end surface 102 or the left side end surface 104 of the combiner 100 is changed according to a degree of risk of the dangerous object. The dangerous object around the vehicle 1 is detected through known various methods. A position of the dangerous object present around the vehicle 1 may be detected, for example, with the use of an ultrasonic sonar or radar. Alternatively, the position of the dangerous object may be detected by analyzing an image obtained by capturing surroundings of the vehicle 1 through an on-board camera. Further, various methods have been known as a method of evaluating the risk degree, which is a degree that the dangerous object is collided with the subject vehicle, by detecting the position of the dangerous object at predetermined time intervals. In the present embodiment, the ultrasonic sonar or radar, and the on-board camera, which are not shown, are mounted to the vehicle 1. The control device 16 analyzes data or an image obtained by the equipment and detects the direction toward which the dangerous object is present, or the risk degree of the dangerous object.

Accordingly, when the dangerous object is detected in the right direction of the vehicle 1, and when it is determined that the risk degree of the dangerous object is small, the control device 16 lightens the blue LED 122B, which is disposed to the right side of the LED unit 120. As described in FIG. 4, the control device 16 turns on the BR output terminal, and turns on the two blue LEDs 122B disposed to the LED unit 120 at the same time.

When the dangerous object is detected in the right direction of the vehicle 1, and it is determined that the risk degree of the dangerous object is medium, the control device 16 turns on the GR output terminal, and turns on the green LED 122G. When the dangerous object is detected in the right direction of the vehicle 1, and when it is determined that the risk degree of the dangerous object is large, the control device 16 turns on the UR output terminal, and turns on the amber LED 122A.

According to this configuration, when the dangerous object is detected on the right side of the vehicle 1, the right side end surface 102 of the combiner 100 emits the light, and in addition, the light emission color changes from blue to green and amber as the risk degree of the dangerous object is larger. Therefore, it may be possible for the driver to intuitively understand the direction toward which the dangerous object is present, and the risk degree of the dangerous object. It is may be possible to immediately cope with the dangerous object.

The similar explanation will be applied to a case in which the dangerous object is detected in a left direction of the vehicle 1. When it is determined that the risk degree of the dangerous object is small, the blue LED 124B turns on, and when it is determined that the risk degree of the dangerous object is medium, the green LED 124G turns on. When the risk degree is large, the amber LED 124A turns on. According to this configuration, as the risk degree of the dangerous object detected on the left side of the vehicle 1 is larger, the color of light emitted by the left side end surface 104 of the combiner 100 changes from blue to green and amber. Thus, it may be possible for the driver to intuitively understand the direction toward which the dangerous object is present, and the risk degree of the dangerous object. It may be possible to immediately cope with the dangerous object.

A case in which dangerous objects are detected in each of the right direction and the left direction of the vehicle 1 may occur. Even in this case, for example, when it is determined that the risk degree of the dangerous object in the right direction is large, but the risk degree of the dangerous object in the left direction is small, the right side end surface 102 of the combiner 100 emits the amber light, and the left side end surface 104 emits the blue light. Therefore, it may be possible for the driver to intuitively understand that the dangerous objects are present in each of the right and left directions and that the driver should first cope with the dangerous object in the right direction.

Figure 7B:
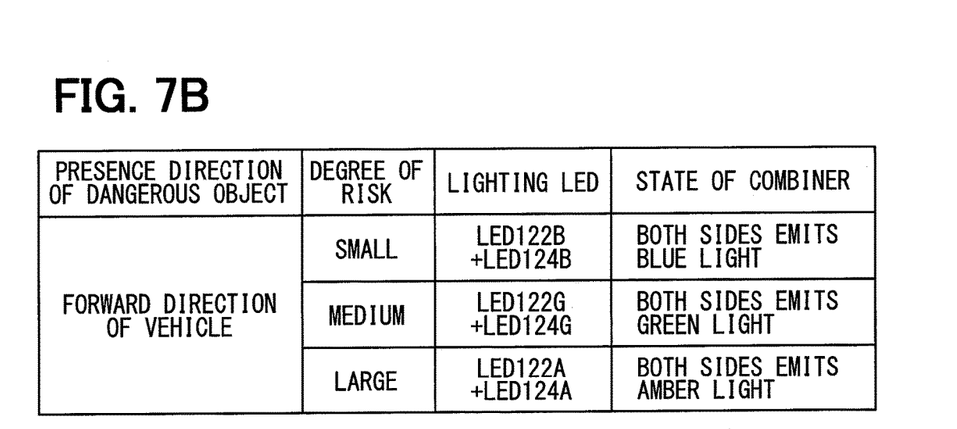
FIG. 7B is a diagram illustrating an example of a method of displaying information on the degree of risk when the dangerous object is detected in front of the vehicle.

When the dangerous object is detected in front of the vehicle 1, both of the right side end surface 102 and the left side end surface 104 may be brightened in the same color at the same time. As illustrated in FIG. 7B, when the dangerous object is detected in front of the vehicle 1, and when the risk degree of the dangerous object is small, the blue LED 122B and the blue LED 124B are turned on at the same time. When the risk degree is medium, the green LED 122G and the green LED 124G are turned on at the same time. When the risk degree is large, the amber LED 122A and the amber LED 124A are turned on at the same time. According to this configuration, it may be possible for the driver to intuitively understand the presence of the dangerous object in front of the vehicle 1, and the risk degree of the dangerous object. It may be possible to cope with the dangerous object immediately.

Incidentally, in the above description, only the LEDs of the same color are turned on in the right LED 122 (or the left LED 124). Alternatively, only the LEDs of the different colors may be turned on in the right LED 122 (or the left LED 124). For example, the blue LED 122B and the green LED 122G may be turned on at the same time, or the green LED 122G may be turned on under a state where the blue LED 122B has been on. According to this configuration, since the kind of colors for brightening the right side end surface 102 (or the left side end surface 104) and modes for changing the colors can increase, it may be possible that more information is recognized by the driver.

In the combiner 100 according to the first embodiment, several modifications are present. Hereinafter, differences of the combiner 100 according to the modifications from the first embodiment will be mainly described. In modifications, parts common to those in the first embodiment are denoted by the identical reference numerals as those in the first embodiment, and a detailed description of the parts will be omitted.

First Modification

Figure 8:
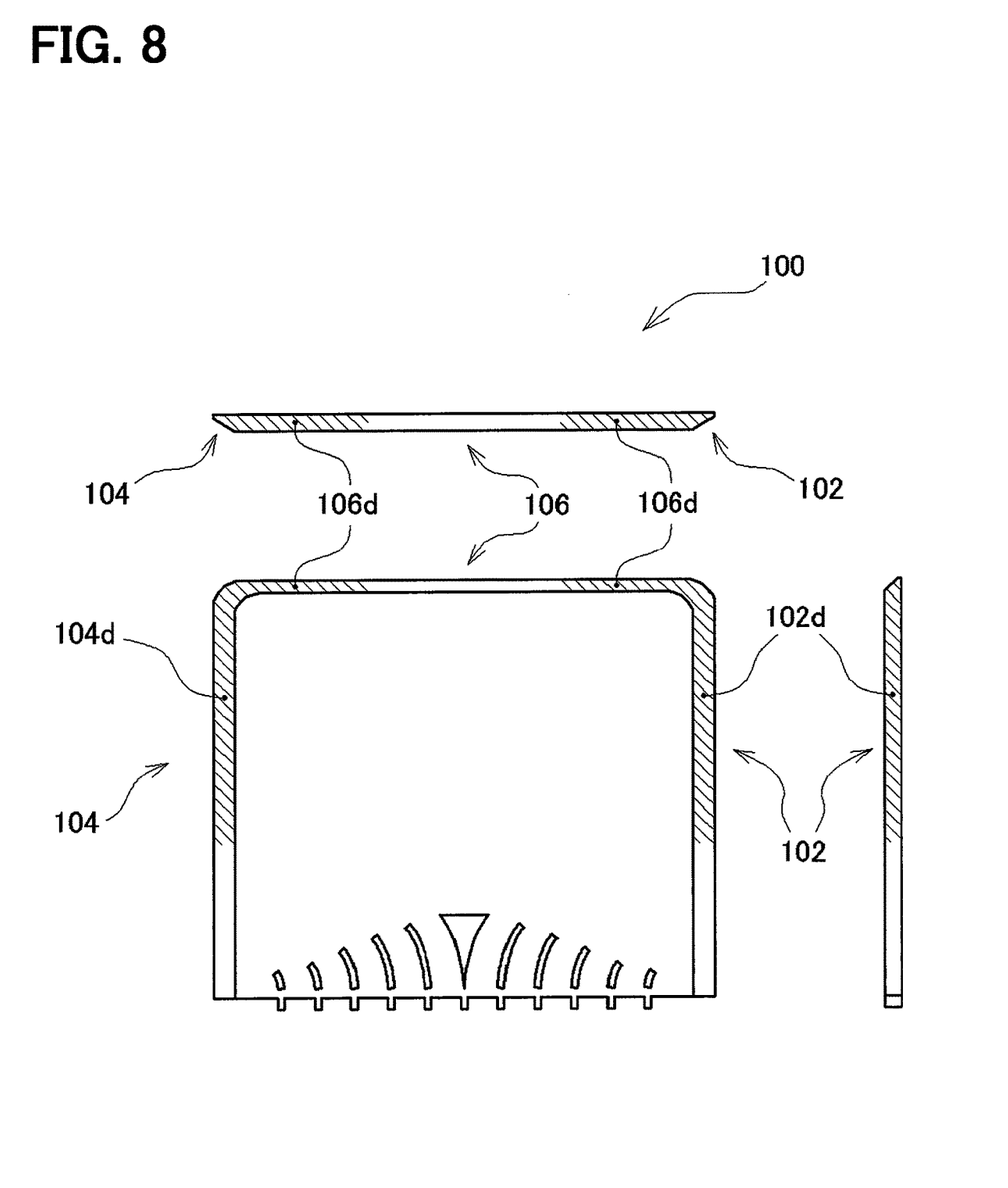
FIG. 8 is a diagram illustrating a combiner according to a first modification.

In the first embodiment, the right side end surface 102, the left side end surface 104, and the upper end surface 106 of the combiner 100 are formed at right angles to a display surface (a surface to which an image is projected) of the combiner 100. Alternatively, as illustrated in FIG. 8, a right side end surface 102, a left side end surface 104, and an upper end surface 106 of the combiner 100 may be formed obliquely toward a driver. In this case, directions toward which the right side end surface 102, the left side end surface 104, and the upper end surface 106 are inclined may be inclined in directions in which the driver can visually recognize the end surfaces, directly or may be inclined in opposite directions. The directions may be inclined in directions in which the driver can visually recognize the end surfaces through the transparent combiner 100 although the driver cannot visually recognize the end surfaces directly.

For example, when the right side end surface 102, the left side end surface 104, and the upper end surface 106 are inclined in the directions along which the driver can visually recognize the end surfaces directly, the driver easily sees the right side embossed surface 102*d* of the right side end surface 102, the left side embossed surface 104*d* of the left side end surface 104, and the upper embossed surface 106*d* of the upper end surface 106. Thus, it may be possible for the driver to easily recognize that the right side embossed surface 102*d*, the left side embossed surface 104*d*, and the upper embossed surface 106*d* are brightened.

By contrast, when the right side end surface 102, the left side end surface 104, and the upper end surface 106 are inclined in the reverse direction, the driver cannot visually recognize the end surfaces directly. But the driver can visually recognize the end surfaces through the transparent combiner 100. Therefore, even when the right side end surface 102, the left side end surface 104, and the upper end surface 106 are inclined in the reverse direction, it may be possible for the driver to easily recognize that the right side embossed surface 102d, the left side embossed surface 104d, and the upper embossed surface 106d are brightened.

Second Modification

In the present embodiment and above modification, the portions of the right side end surface 102, the left side end surface 104, and the upper end surface 106 of the combiner 100, which are subjected to emboss processing, irregularly reflect the light. The emboss processing may not be required as long as the light that reaches the right side end surface 102, the left side end surface 104, or the upper end surface 106 can be irregularly reflected.

For example, a light diffusion member made of a transparent material in which fine particles that scatter the light are dispersed may be disposed on the end surfaces of the combiner 100.

Figure 9:
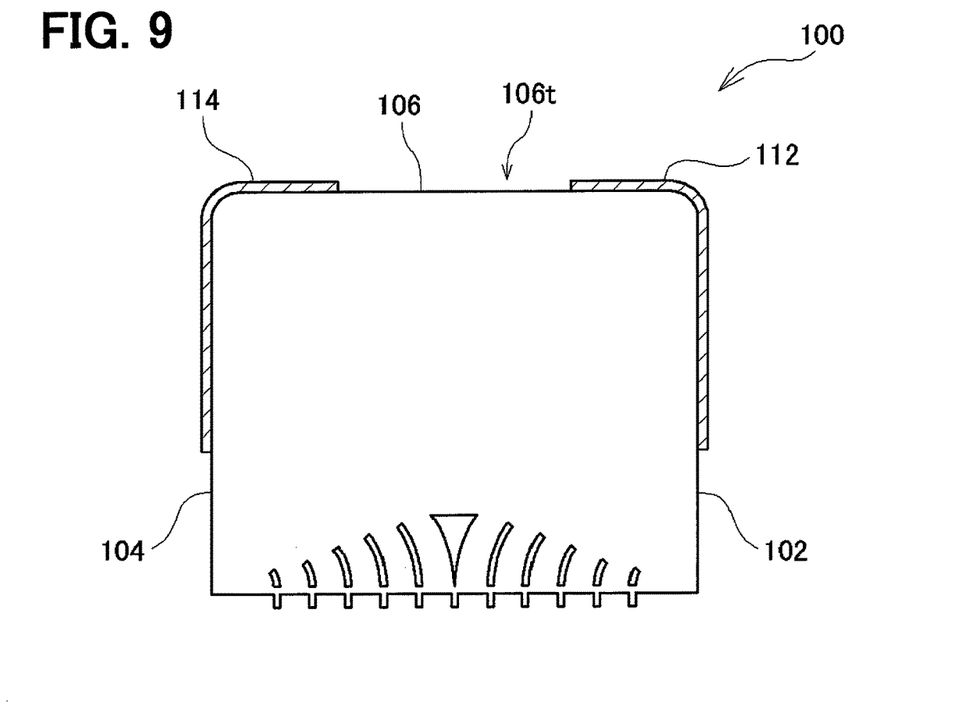
FIG. 9 is a diagram illustrating a combiner according to a second modification.

FIG. 9 illustrates a second modification in which a light diffusion member is provided to the end surfaces of the combiner 100. In this example, a right side light diffusion member 112 is fitted to an area extending from the right side end surface 102 to the right side of the upper end surface 106 in the combiner 100. A left side light diffusion member 114 is also fitted to an area extending from the left side end surface 104 to the left side of the upper end surface 106 in the combiner 100. The right side light diffusion member 112 and the left side light diffusion member 114 are made of a transparent material (for example, acrylic resin) and fine particles that scatter the light (for example, titanium dioxide fine powder) are dispersed in the members. Since the light entering the right side light diffusion member 112 is irregularly reflected by the dispersed fine particles, the right side light diffusion member 112 is brightened. Similarly, when light enters the left side light diffusion member 114, the left side light diffusion member 114 is brightened.

Since the right side light diffusion member 112 and the left side light diffusion member 114 have a thickness, it may be possible for the driver to easily recognize that the right side light diffusion member 112 or the left side light diffusion member 114 are brightened.

In the second modification, a portion of the right side light diffusion member 112, which is fitted to the right side end surface 102, corresponds to a first diffusion unit. A portion of the left side light diffusion member 114, which is fitted to the left side end surface 104, corresponds to a second diffusion unit. A portion of the right side light diffusion member 112 or the left side light diffusion member 114, which is fitted to the upper end surface 106, corresponds to a light diffusion unit. A portion of the upper end surface 106, which is not fitted to both of the right side light diffusion member 112 and the left side light diffusion member 114 corresponds to a light transmission unit.

Third Modification

In the embodiment and modification described above, the light is reflected toward the right side end surface 102 or the left side end surface 104 with the air groove 110, which is provided in the combiner 100. As long as the light emitted from the LED unit 120 is reflected toward the right side end surface 102 or the left side end surface 104, the air groove 110 may not be required to be provided in the combiner 100.

For example, a reflector made of metal or subjected to metal plating may be disposed between the LED unit 120 and the combiner 100 in advance, and the light emitted from the LED unit 120 may be reflected on the right side end surface 102 or the left side end surface 104 with the reflector.

Figure 10:
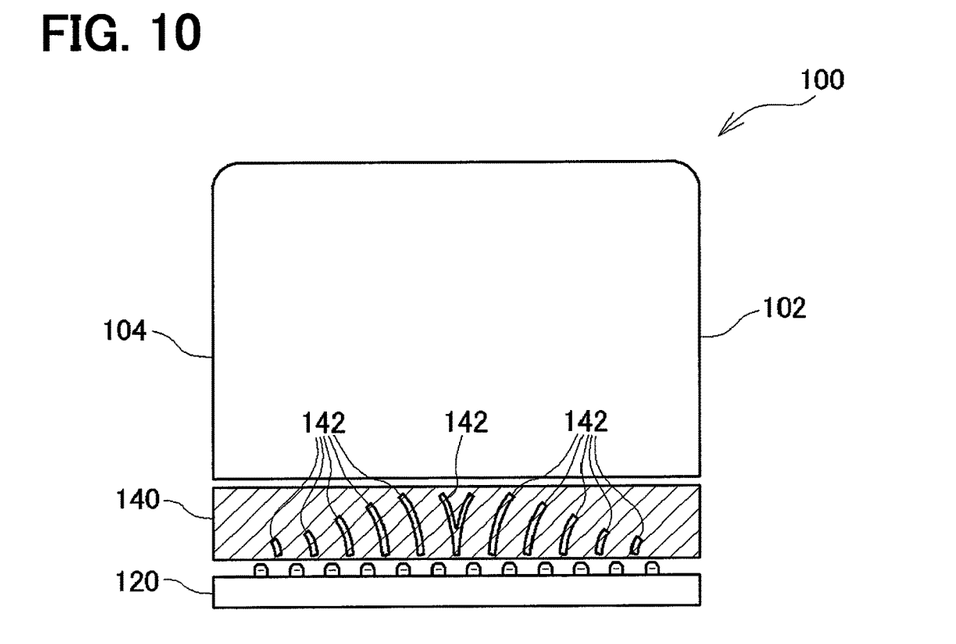
FIG. 10 is a diagram illustrating a combiner and a reflection unit according to a third modification.

FIG. 10 illustrates the third modification. In the third modification, a reflective unit 140 is disposed between an LED unit 120 and a combiner 100. The reflective unit 140 is made of hard resin, and entirely subjected to metal plating. Multiple convex portions 142 each shaped into a curved plate are projected between the LED unit 120 and the combiner 100. Thus, the light emitted from the LED unit 120 is reflected on surfaces of the convex portions 142, and travels toward the right side end surface 102 or the left side end surface 104. Therefore, the light brightens the right side end surface 102 or the left side end surface 104 of the combiner 100.

In the third embodiment, even when the conditions of total reflection are not satisfied, since all of the lights are reflected on the surfaces of the convex portions 142, it may be possible to improve the degree of freedom of design of the combiner 100. By contrast, in the embodiment or the various modifications described above, since there is no need to provide the reflective unit 140 in addition to the combiner 100, the number of components is reduced, and therefore it may be possible to manufacture the head-up display apparatus simply and inexpensively.

The first embodiment and the various modifications have been described above, but the present disclosure is not limited to the above embodiment and modifications, and may be variously implemented without departing from the spirit of the invention.

For example, in the first embodiment, the first modification, and the second modification, the air groove 110 is defined to penetrate through the front and rear sides of the combiner 100. The air groove 110 is simply required to totally reflect the light traveling in the interior of the combiner 100, and may not be always required to penetrate through the front and rear sides of the combiner 100. For example, the air groove 110 may be blocked on the front side or the rear side of the combiner 100.

In the first embodiment and the various modifications, the combiner 100 is disposed to the dashboard 2, and therefore the region below the combiner 100 provides the invisible region where the driver does not see, and the air groove 110 is disposed below the combiner 100. Alternatively, the combiner 100 may be erected from a ceiling of the vehicle 1. In this case, a region above the combiner 100 provides an invisible region, and therefore the air groove 110 may be defined above the combiner 100.

In the first embodiment and the various modifications, the combiner 100 is fixed to the dashboard 2. Alternatively, a movable mechanism of the combiner 100 may be provided within the dashboard 2, and the combiner 100 may be stored into the dashboard 2, or the combiner 100 may be projected from the dashboard 2 as occasion demands.

What is claimed is:

1. A head-up display apparatus that projects an image to a surface of a combiner and displays the image superimposed to a front view of the combiner, the combiner being a transparent plate member disposed in front of a driver seat, the head-up display apparatus comprising:
    a plurality of light emission units that are disposed along one end surface of an upper end surface or a lower end surface of the combiner, and emit light toward an interior of the combiner from the one end surface;
    a first reflection unit that is disposed near a part of the plurality of light emission units, and reflects the light emitted by the light emission units toward the interior of the combiner, toward a first side end surface that is one side end surface of the combiner;

a second reflection unit that is disposed near a part of the plurality of light emission units, and reflects the light emitted by the light emission units toward the interior of the combiner, toward a second side end surface that is a side end surface facing the first side end surface;

a first diffusion unit that is disposed in the first side end surface of the combiner, and diffuses the light reaching the first side end surface through the interior of the combiner;

a second diffusion unit that is disposed in the second side end surface of the combiner, and diffuses the light reaching the second side end surface through the interior of the combiner; and a driver unit that     selectively drives at least one of         the light emission unit provided with the first reflection unit and         the light emission unit provided with the second reflection unit, and     causes to emit the light from the driven light emission unit wherein:

the combiner includes an invisible region that is provided within an area of a predetermined distance from the one end surface on which the plurality of light emission units are disposed, the invisible region being not visually recognized by a driver; and the first reflection unit and the second reflection unit each is an air groove provided within the invisible region, and obliquely blocks a traveling direction of the light emitted from the light emission units.

2. The head-up display apparatus according to claim 1, wherein:

the air groove is provided at an angle by which a side surface of the air groove blocking the light emitted from the light emission units satisfies a condition of total reflection in the traveling direction of the light.

3. The head-up display apparatus according to claim 1, wherein:

the first diffusion unit included in the first side end surface of the combiner has an irregular shape; and the second diffusion unit included in the second side end surface of the combiner has an irregular shape.

4. The head-up display apparatus according to claim 3, wherein:

the combiner is a member in which each of the first side end surface and the second side end surface in the combiner is oblique to the surface of the combiner to which the image is projected.

5. The head-up display apparatus according to claim 1, wherein:

the combiner includes a light diffusion unit and a light transmission unit in the upper end surface or the lower end surface wherein the light emission units are not disposed;

the light diffusion unit is disposed in a region close to the first side end surface and a region close to the second side end surface, and diffuses the light reaching the light diffusion unit through the interior of the combiner; and the light transmission unit is disposed between the light diffusion unit on a side of the first side end surface and the light diffusion unit on a side of the second side end surface, and transmits the light more than the light diffusion unit.

6. The head-up display apparatus according to claim 1, wherein:

each of the light emission units includes a plurality of kinds of light emission elements different in color of the emitted light from each other; and the driver unit selects at least one of colors of the light to be emitted, and drives a light emission element that emits the light of the selected color.

* * * * *